US 7,346,217 B1

(12) United States Patent
Gold, Jr.

(10) Patent No.: US 7,346,217 B1
(45) Date of Patent: Mar. 18, 2008

(54) DIGITAL IMAGE ENHANCEMENT USING SUCCESSIVE ZOOM IMAGES

(75) Inventor: V. Edward Gold, Jr., Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 605 days.

(21) Appl. No.: 10/916,072

(22) Filed: Aug. 10, 2004

Related U.S. Application Data

(63) Continuation-in-part of application No. 10/125,348, filed on Apr. 19, 2002, now Pat. No. 7,016,550, and a continuation-in-part of application No. 09/840,920, filed on Apr. 25, 2001, now Pat. No. 6,901,173, and a continuation-in-part of application No. 09/841,081, filed on Apr. 25, 2001, now Pat. No. 6,973,218, and a continuation-in-part of application No. 09/841,079, filed on Apr. 25, 2001, now Pat. No. 7,103,235.

(51) Int. Cl.
*G06K 9/00* (2006.01)
*G06K 9/62* (2006.01)
*G06K 9/72* (2006.01)
*H04N 5/228* (2006.01)
*H04N 7/12* (2006.01)

(52) U.S. Cl. ............ 382/236; 382/103; 382/107; 382/209; 382/218; 348/208.4; 348/400.1; 348/411.1; 375/240.16; 375/240.21

(58) Field of Classification Search ................ 382/103, 382/107, 209, 218–221; 348/208.4, 208.13, 348/400.1–402.1, 411.1–418.1; 375/240.16–240.22
See application file for complete search history.

(56) References Cited

U.S. PATENT DOCUMENTS

| 4,783,738 | A | * | 11/1988 | Li et al. ................ 712/21 |
| 4,972,495 | A | * | 11/1990 | Blike et al. ............. 382/304 |
| 5,053,876 | A | * | 10/1991 | Blissett et al. ........ 348/208.14 |
| 5,535,291 | A | * | 7/1996 | Spencer et al. .......... 382/254 |
| 5,600,737 | A | * | 2/1997 | Murakami et al. ....... 382/232 |
| 5,612,743 | A | * | 3/1997 | Lee .................... 375/240.16 |

(Continued)

OTHER PUBLICATIONS

"Lockheed Martin Delivers First "Hawkeye" Target Sight System to Bell Helicopter Textron", *MFC Press Release*, (Aug. 16, 2001).

*Primary Examiner*—Bhavesh M. Mehta
*Assistant Examiner*—Manav Seth
(74) *Attorney, Agent, or Firm*—Jeffrey D. Myers; Peacock Myers, P.C.; Timothy D. Stanley

(57) ABSTRACT

A method and Electro-Optical (EO) system for processing imagery comprising selecting a first frame of data as a template frame; capturing a second frame of data using the EO system, for a plurality of pixels of the second frame, correlating the plurality of pixels of the second frame with pixels of the template frame to generate a plurality of shift vectors, one for each pixel of the plurality of pixels of the second frame, registering the second frame with the template frame by interpolating the second frame using the plurality of shift vectors and re-sampling at least a portion of the second frame to produce a registered frame, re-sampling the template frame, and combining the re-sampled template frame and the registered frame to generate an averaged frame.

18 Claims, 2 Drawing Sheets

U.S. PATENT DOCUMENTS

| | | | |
|---|---|---|---|
| 5,657,402 A | * | 8/1997 | Bender et al. ............... 382/284 |
| 5,659,363 A | * | 8/1997 | Wilkinson ............. 375/240.11 |
| 7,103,235 B2 | * | 9/2006 | Tener et al. ................. 382/294 |
| 2002/0159101 A1 | | 10/2002 | Alderson et al. |
| 2002/0159648 A1 | | 10/2002 | Alderson et al. |
| 2002/0159651 A1 | | 10/2002 | Tener et al. |
| 2003/0198400 A1 | | 10/2003 | Alderson et al. |

* cited by examiner

DIGITAL IMAGE ENHANCEMENT USING SUCCESSIVE ZOOM IMAGES

CROSS-REFERENCE TO RELATED APPLICATIONS

The present application is a continuation-in-part application of the following applications: (1) U.S. patent application Ser. No. 09/840,920, entitled "Scene-based non-uniformity correction for detector arrays", filed Apr. 25, 2001, and published as Publication No. 2002/0159101 on Oct. 31, 2002; (2) U.S. patent application Ser. No. 09/841,081, entitled "Dynamic range compression", filed Apr. 25, 2001, and published as Publication No. 2002/0159648 on Oct. 31, 2002; (3) U.S. patent application Ser. No. 09/841,079, entitled "Extended range image processing for electro-optical systems", filed Apr. 25, 2001, and published as Publication No. 2002/0159651 on Oct. 31, 2002; and (4) U.S. patent application Ser. No. 10/125,348, entitled "Scene-based non-uniformity offset correction for staring arrays", filed Apr. 19, 2002, and published as Publication No. 2003/0198400 on Oct. 23, 2003, and the specifications thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to image enhancement of digital images, particularly via processing image data acquired via Electro-Optical (EO) systems.

2. Description of Related Art

EO systems are often used for "remote sensing." The term "remote sensing" generally refers to the acquisition and measurement of data/information related to one or more properties of a phenomenon, object, or material by a recording device not in physical contact with the object under surveillance. Imaging techniques often involve gathering information by measuring electromagnetic fields, electromagnetic radiation, or acoustic energy using cameras, radiometers, scanners, lasers, radio frequency receivers, radar systems, sonar, thermal devices, seismographs, magnetometers, gravimeters, scintillometers, and like instruments. For example, such data can be acquired and interpreted to remotely sense information about features associated with a target.

Intelligence gathering, particularly within strategic, tactical, or otherwise hostile environments, often relies on technology generally referred to as Enhanced Vision (EV) systems. Through the use of imaging sensors, such as Charge-Coupled Device (CCD) cameras, Forward-Looking Infrared (FLIR), vidicon cameras, Low Light Level cameras, laser illuminated cameras, and the like, targets can be acquired and imagery can be processed and viewed at significantly longer ranges than otherwise possible.

With reference to, for example, FLIR systems, remote sensing can refer to the detecting and measuring of electromagnetic energy, usually thermal or photonic, emanating from distant objects made of various materials. Using FLIR imaging, objects can be identified and categorized by, for example, class, type, substance, or spatial distribution.

To facilitate the acquisition and processing of information from EO systems, sensors can be used on a system's front end to generate raw data for processing. Such sensors can be radar imaging sensors, infrared imaging sensors, electro-optic sensors and the like. In each case, information from which image features can be derived can be used to generate image frames which can then be input to, for example, a display system. Image frames can be integrated with other operational features to form a stable display and to allow for such functions as target identification, acquisition, and tracking to be performed. Such systems can be linked to defense systems to provide guidance input and ordnance control.

In conventional EO systems, the sensors used are limited in their resolution by the fixed spacing between sensor elements. Because of the Nyquist frequency of the sensor as determined by element spacing, image artifacts such as aliasing can be evident in the displayed imagery. A similar type of distortion can arise in, for example, a scene containing edge transitions which are so close together that a sensor cannot accurately resolve them. Resultant distortion can manifest itself as color fringes, in a color camera, around an edge or the like, reducing the ability of a viewer to perceive, for example, letters or object outlines with clarity. Range performance of an EO sensor is also often limited by the Nyquist frequency of the sensor, particularly those containing staring focal-plane arrays. In addition, sensor range can be limited by distortion levels or noise associated with sensor construction.

A conventional method of improving the range performance of an EO system is to improve upon the optics of the system. Such improvements include increasing the focal length of the optics and improving the F/number, i.e., the ratio between the focal length and the aperture size (diameter of a lens), of the system. These types of improvements, however, increase the cost and size of the system, which can lead to a design that is too costly or too large to fit the application.

One technique for addressing the range performance and Nyquist frequency limitations of an EO system is to dither the system, such that the system will sample once, then move the sensor over some sub-pixel amount, and then sample again. Such a technique gives the EO system the appearance that the image is sampled twice as often, and, therefore, the Nyquist frequency of the sensor has effectively doubled. This is often implemented using a dither mechanism such as a Fast Scan Mirror (FSM). However, dither mechanisms, such as a FSM, are usually very expensive and are sensitive to vibrations and alignment.

Accordingly, it is desirable to improve the range performance of EO systems while preserving the integrity of existing EO systems.

The base XR (extended range) technology as disclosed in U.S. patent application Ser. No. 09/841,079, referenced above, is an excellent first step toward image fidelity enhancement; however, this approach is limited in a number of ways. First, the base XR algorithm is limited in practice to a very small sub-image of about 64×64 pixels. Second, the base XR algorithm can only improve those pixels within the image that are moving in unison such that if the XR window is tracking a moving target, all other details outside that target are obscured. Third, if one were to try to utilize the base XR algorithm on a fixed wing aircraft, the change in perspective caused by the aircraft's own motion will degrade the XR algorithm's effectiveness. Finally, for target classification purposes, the base XR algorithm is useful for classification of an already detected target, but one cannot effectively employ it until after one has already located the target, particularly because of the small sub-image limitation.

The approach taken by the present invention solves such problems, though it comes at some hardware expense. In order to offer the best fidelity improvement at each location within the image, each pixel needs to be compensated independently of every other pixel. This requires that a unique motion vector be generated for each and every pixel of the output region.

The base XR algorithm of U.S. patent application Ser. No. 09/841,079 employs a motion vector used to align the current (electronically zoomed) input image with a reference image. This works perfectly as long as all the pixels in the input image experience the same motion relative to the sensor. Of course, all pixels that move differently than the average motion of the group will be blurred by the algorithm or at best case, they will receive no improvement.

The present invention dedicates a separate correlation tracking algorithm to each pixel within the desired output image. Using this technique, each pixel receives individual motion compensation based on matching the local neighborhood between the reference frame and the input image.

BRIEF SUMMARY OF THE INVENTION

The present invention is of a method for processing imagery using an Electro-Optical (EO) system, comprising: selecting a first frame of data as a template frame; capturing a second frame of data using the EO system; for a plurality of pixels of the second frame, correlating the plurality of pixels of the second frame with pixels of the template frame to generate a plurality of shift vectors, one for each pixel of the plurality of pixels of the second frame; registering the second frame with the template frame by interpolating the second frame using the plurality of shift vectors and re-sampling at least a portion of the second frame to produce a registered frame; re-sampling the template frame; and combining the re-sampled template frame and the registered frame to generate an averaged frame. In the preferred embodiment, re-sampling comprises electronic zooming. It is preferred to digitally enhance and/or filter the second frame. Registering motion compensate aligns the second frame to the template frame or motion compensate aligns the template frame to the second frame. Preferably, at least the registering step is executed by a Geometric Arithmetic Parallel Processor (GAPP) processor, with each pixel of the second frame having a one-to-one correspondence with processing elements of the GAPP processor. Alternatively, at least the registering step is executed by a Field Programmable Gate Array (FPGA). Registering and resampling result in a unique reference image comprising the re-sampled template frame for each pixel of the second frame. A user is preferably permitted to switch to an alternate method of image enhancement providing a single shift vector rather than one for each pixel of the second frame.

The invention is also of an Electro-Optical (EO) system for processing imagery, comprising: a sensor for generating input data; and a processor module coupled to the sensor, the processor module configured to: select a first frame of data as a template frame; capture a second frame of data using the EO system; for a plurality of pixels of the second frame, correlate the plurality of pixels of the second frame with pixels of the template frame to generate a shift vector a plurality of shift vectors, one for each pixel of the plurality of pixels of the second frame; register the second frame with the template frame by interpolating the second frame using the plurality of shift vectors and re-sampling at least a portion of the second frame to produce a registered frame; re-sample the template frame; and combine the re-sampled template frame and the registered frame to generate an averaged frame. In the preferred embodiment, the processor module re-samples via electronic zooming. The processor module is additionally configured to digitally enhance and/or filter the second frame. The processor module registers by motion compensate aligning the second frame to the template frame or by motion compensate aligning the template frame to the second frame. The processor module preferably comprises a Geometric Arithmetic Parallel Processor (GAPP) processor, wherein each pixel of the second frame has a one-to-one correspondence with processing elements of the GAPP processor. Alternatively, the processor module comprises a Field Programmable Gate Array (FPGA). The processor module by registering and resampling creates a unique reference image comprising the re-sampled template frame for each pixel of the second frame. It preferably additionally permits a user to switch to an alternate type of image enhancement providing a single shift vector rather than one for each pixel of the second frame.

The invention is further of an Electro-Optical (EO) system for processing imagery, comprising: a sensor for generating input data; and a processor module coupled to the sensor, the processor module comprising a Geometric Arithmetic Parallel Processor (GAPP) processor and configured to: select a first frame of data as a template frame; capture a second frame of data using the EO system; and for a plurality of pixels of the second frame, correlate the plurality of pixels of the second frame with pixels of the template frame to generate a shift vector a plurality of shift vectors, one for each pixel of the plurality of pixels of the second frame.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a system and method for enhancing digital images, particularly those acquired by EO systems. The invention dedicates a separate correlation tracking algorithm to each pixel within the desired output image. Using this technique, each pixel receives individual motion compensation based on matching the local neighborhood between the reference frame and the input image. The invention provides a larger coverage area than with existing technology, thereby providing enhanced imagery for any application, particularly for target detection. The invention also provides per-pixel motion compensation, with concomitant higher quality images, particularly in scenarios where the current XR technology would have difficulty.

The invention preferably performs a per-pixel registration of electronically zoomed successive video frames to provide enhanced image fidelity. Electronic zoom normally just creates pseudo-data between pixels; however, by temporally blending in motion adjusted data, the invention can actually "fill in the data holes" with real image detail. The invention preferably proceeds via the following steps:

(1) Input image is electronically zoomed by 2×, 4×, or even 8× or more;

(2) The electronically zoomed input image is preferably digitally enhanced/filtered according to known methods as described, for example, in the four related applications first mentioned above;

(3) The filtered, zoomed input image is compared to a reference image to determine the per-pixel motion between the reference and the input image pixels;

(4) Depending upon the operational mode, either the input pixels are motion compensation aligned to the reference image, or the reference image pixels are motion compensation aligned to the input image; and (5) If the comparison results in a sufficiently close match, the aligned data is blended together into the output image. The output image becomes the new reference image.

Figure 1:
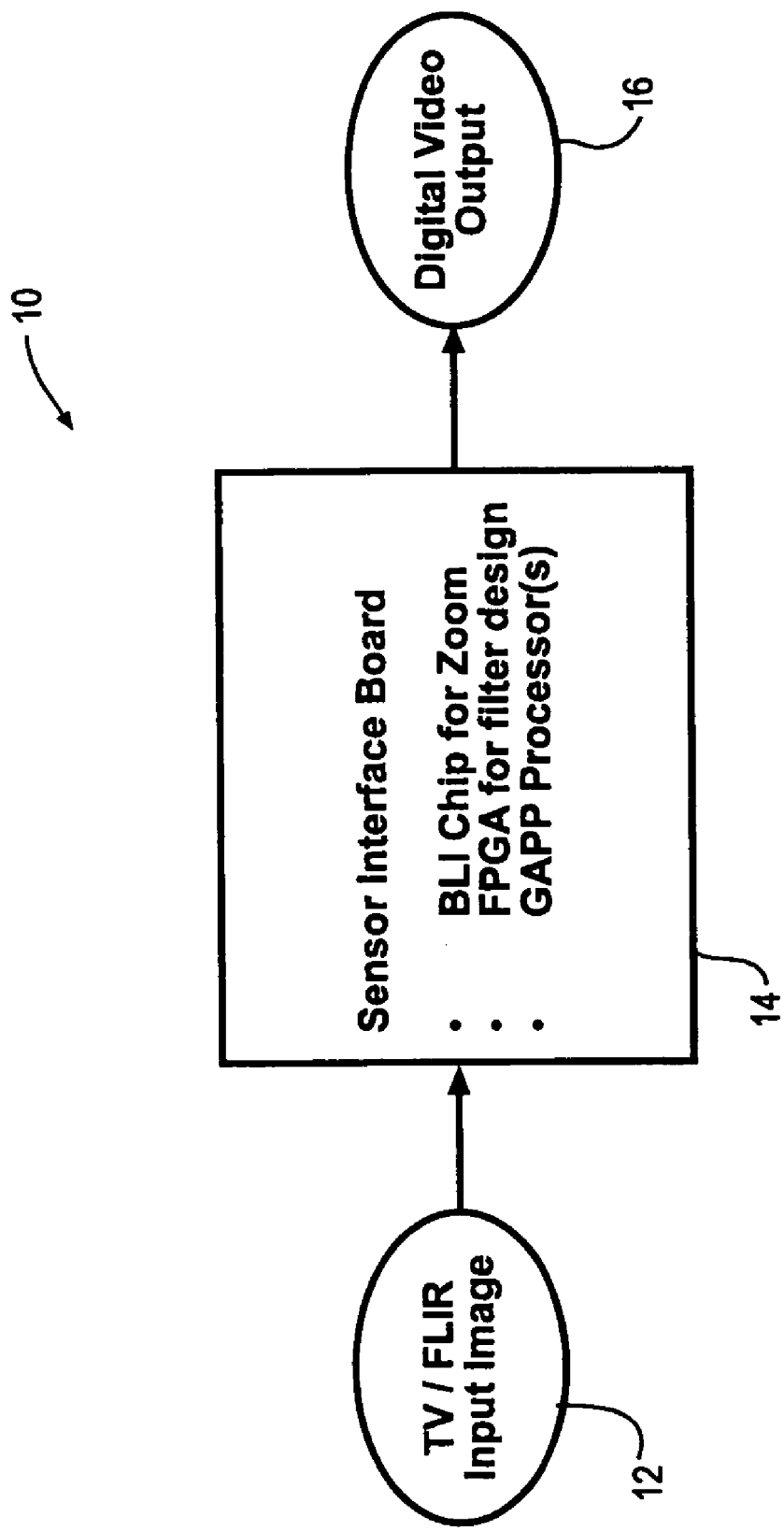
FIG. 1 is a block diagram of the preferred image enhancement system of the present invention.

FIG. 1 is a block diagram of the preferred system 10 of the invention. An input image is provided by a video device 12 to a sensor interface unit 14, which then outputs a processed image to a receiving device 16 (e.g., a personal computer, computer monitor, or like processing or display apparatuses).

The video device can be, for example, a CCD camera, FLIR, a vidicon camera, a Low Light Level camera, a laser illuminated camera, or any other EO sensor capable of collecting image data. The sensor interface unit preferably comprises a processor module including a Bi-Linear Interpolation (BLI) chip for zoom operations, a Field Programmable Gate Array (FPGA) for initial image filtering and enhancement, and a Geometric Arithmetic Parallel Processor (GAPP) processor for performing the algorithm of the invention. The processor module can alternately be implemented with a general purpose microprocessor (e.g., a general purpose microprocessor from Intel, Motorola, or AMD). The FPGA is preferably a Virtex Series FPGA from Xilinx that can have from, for example, one million to three million gates per FPGA, or an equivalent device with the same or more gates.

The GAPP processor is a fine-grained, massively parallel, two dimensional mesh computer that is uniquely efficient for two dimensional video processing applications. The preferred embodiment of the invention employs a massively parallel super-computer organized in a two-dimensional Single Instruction Multiple Data (SIMD) architecture. Effectively, this is a collection of thousands of Reduced Instruction Set Computer (RISC) type computers operating in unison. The computers, called Processing Elements (PE's), are arranged in a two dimensional grid—each PE linked to the four PE's closest to it in the grid. Each PE has its own data memory, and all PE's run the same program simultaneously. For example, there may be 1024 PE's on each chip, arranged in a grid 32 PE's wide by 32 PE's high. Running at a clock speed of 90 MHz, each chip can execute over 90 billion operations per second (BOPS). Furthermore, the architecture is fully scalable—the chips can be combined in two-dimensional arrays to build computers with over 1 million PE's, yielding computing performance measured in trillions of operations per second (TeraOPs). While capable of enormous processing power, computers built to the SIMD architecture are highly specialized in function. SIMD works well on problems that require large amounts of data to be processed in exactly the same way. GAPP is therefore ideally suited to perform the digital image processing tasks of the present invention. The preferred GAPP units are those available from Teranex Inc.

Figure 2:
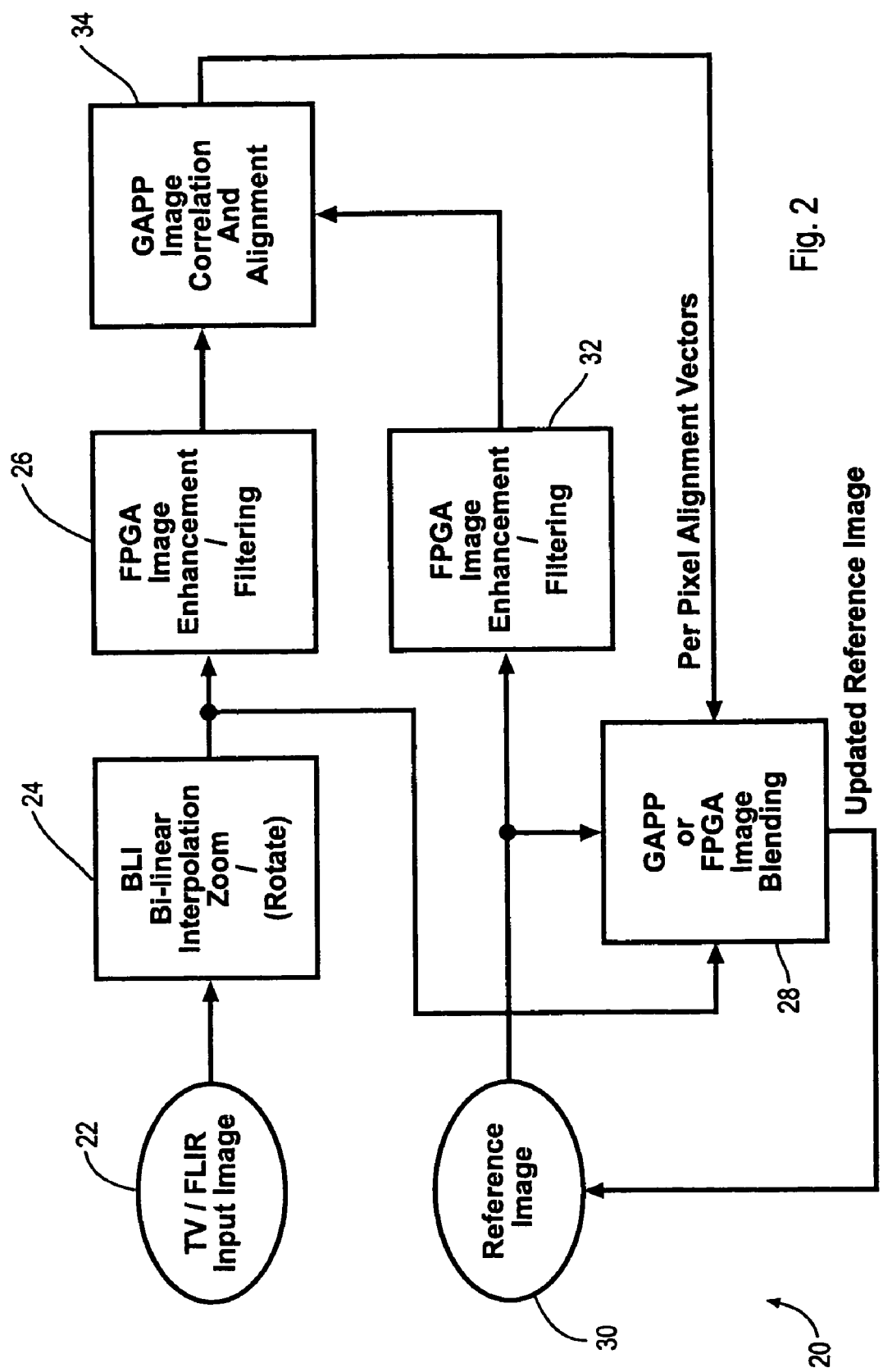
FIG. 2 is a flow diagram of the preferred method of the invention.

FIG. 2 illustrates the preferred method 20 of the invention. An input image 22 (e.g., FLIR or an NTSC format image) is passed to a zoom operation 24 (e.g., one done by Bi-Linear Interpolation (BLI); rotation may optionally be performed). The zoomed image is then passed to image enhancement and/or filtering 26 (preferably performed by FPGA) as well as to the image blending routine 28 of the invention (preferably performed by GAPP or, alternatively, FPGA). A reference image 30 is passed to the image blending routine and to image enhancement and/or filtering 32 (preferably performed by FPGA). Routines 26 and 32 pass their output to an image correlation and alignment routine 34 (preferably performed by GAPP or, alternatively, FPGA), which passes its resulting image to the image blending routine, which generates an updated reference image.

GAPP is preferred for image blending for the following reasons:

The alignment computation for image blending is based on correlation:

$$\text{Metric}(m,n) = \Sigma_{i=0,I-1} \Sigma_{j=0,J-1} |\text{Reference}(i,j) - \text{Input}(i+m, j+n)|.$$

The base XR algorithm compares a single reference image to the current input frame. The present invention utilizes a unique reference image centered about every pixel in the image and a unique "metric image" is computed for each pixel as well. This is a formidable task to implement in FPGA; however, GAPP is admirably suited.

With GAPP, each zoomed, filtered input pixel can be assigned to a single processor cell. By shifting either the input image or the reference image by some known amount, one can align the two images for analysis. One then computes the absolute difference at each location, then performs the local box summation to compute one element of the correlation metric surface for each cell in the array. One can then retain that result and compare it to subsequent results, which one gets by repeating the process with different alignments. Pseudo-code for this preferred method is next supplied.

/* How to Simultaneously Compute motion vector at all locations */ for( x_off = x_left ; x_off < x_right ; ++x_off )
{

```
for( y_off = y_top ; y_off < y_bottom ; ++y_off )
{
    ShiftImage( ZoomedInputImage, ShiftedInput, x_off,
        y_off );
    Subtract( ShiftedInput, ReferenceImage, temp );
    AbsValue( temp, temp );
    BoxSum( temp, temp, RefSizeX, RefSizeY );
    CmpLE( temp, BestMetricValue, MaxFlag );
    /*** if MaxFlag is TRUE, BestMetricValue replaces
        RunnerUp ***/
    Fork( RunnerUp, BestMetricValue, MaxFlag, Run-
        nerUp );
    Fork( PixelValue2, PixelValue1, MaxFlag, Pixel-
        Value2 );
    Fork( VectorX_R2, VectorX, MaxFlag, VectorX_R2 );
    Fork( VectorY_R2, VectorY, MaxFlag, VectorY_R2 );
    /*** if MaxFlag is TRUE, temp replaces BestMet-
        ricValue ***/
    Fork( BestMetricValue, temp, MaxFlag, BestMet-
        ricValue );
    Fork( PixelValue1, ShiftedInput, MaxFlag, Pixel-
        Value1 );
    Fork( VectorX, x_off, MaxFlag, VectorX );
    Fork( VectorY, y_off, MaxFlag, VectorY );
}
}
```

ShiftImage( input, output, x, y ): shifts input image by x columns and y rows.

Requires 1 + sizeof( input ) = 17 clock cycles.

Subtract( a, b, c ): c(i,j) = a(i,j)−b(i,j)

Requires 2+ sizeof(MAX( a, b )) = 18 clock cycles.

AbsValue( input, output ): output(i,j) = | input(i,j) |

Requires 2 + sizeof( input ) = 17 clock cycles.

BoxSum( input, output, size_x, size_y ): computes the area summation over a box of size specified by size_x and size_y dimensions. Requires 2 + sizeof(input) clock cycles per add, so a 16×16 reference would require 8 add operations which would total 8*[2+16]=144 clock cycles.

CmpLE( A, B, C ): C(i,j) = (A(i,j) <= B(i,j))

Requires 2 + sizeof( MAX(A,B) )=18 clock cycles.

Fork( A, B, S, C ): C(i,j) = (A(i,j)* /S (i,j)) + (B(i,j)* S (i,j))

Requires 2 + sizeof( MAX(A,B) ) = 18 clock cycles. 8 of these are preferred, resulting in use of 144 clock cycles.

Total cycles = 358 clock cycles per search area pixel.

At a clock speed of 133 MHz (150 MHz or faster chips are also presently available), this results in a 2.69 μS per pixel of search area. A 32×32 search area requires 2.76 μS total processing time, while a 16×16 search area requires 689 μS total processing time The present invention can also be implemented within an FPGA, which has the advantage that hardware engineers are more familiar with FPGA interfacing issues but which has the disadvantages that FPGA is not as flexible as GAPP and it would be utilized to nearly its total capacity.

With the present invention, local motion estimation may become distracted by external detail at the target's perimeter. In cases where uniform group motion occurs, one large central correlation calculation may provide a better motion estimation for the entire grouping. This can be overcome by adding additional logic that responds when poor correlation occurs and falls back to prior art XR for those affected pixels.

A system according to the present invention preferably can improve image fidelity in at least three different ways:

Mode 1—The invention can perform the identical functionality of the base XR algorithm. As a bonus, it has at least enough processing capability to support at least four concurrent base XR processes.

Mode 2—The invention can perform per-pixel reference stabilized XR which offers the operator a stabilized picture while producing the best possible picture. This helps with multiple moving targets going in different directions; however, the algorithm would attempt to force successive frames back into their original position which can be very misleading.

Mode 3—The invention performs per-pixel input stabilized XR, which offers the operator the highest fidelity live video, using previous imagery to improve the image detail without distorting the motion within the scene. Multiple moving targets are enhanced to facilitate detection and recognition.

As may now be understood by the reader, the present invention provides the following advantages:

The invention gives the operator a wide view, and so is useful for detecting threats and objects of interest. The base XR algorithm can only enhance objects that have already been detected and tracked. Therefore, with the invention the operator gains a huge advantage in being the first to detect his/her opponent.

The invention attempts to enhance all regions of the imagery, not just the target. This allows the operator to notice additional threats while currently tracking a known threat. The base XR algorithm gives the operator a great picture of the object of interest, but it locks him/her into a "tunnel vision" image where he/she cannot see new threats.

The invention is less sensitive to target rotation, size variation, and changes in viewing angle. The invention is far better suited for fixed wing applications than would be the prior art XR algorithm.

With this invention, the operator can choose between the traditional reference stabilized view as well as an input stabilized mode. This input stabilized mode shows the live motion as it happens, only with enhanced detail derived from previous frames.

As previously noted, EO sensor performance can often be limited in resolution by stabilization performance in high contrast conditions. Sensitivity, as can be represented, for example, by a signal-to-noise ratio (SNR) measure, also can limit performance in low contrast conditions. Thus, extended range image processing in accordance with the present invention can overcome limitations associated with conventional systems and significantly increase the effective performance range of an associated EO system. Additional effective range capabilities provide higher probability of target/object recognition and identification which can, for example, enhance the battlefield survivability of a military aircraft equipped with a system in accordance with the present invention, and reduce the risk of casualties due to friendly fire. Additional range provided in accordance with the present invention can also provide an increased margin of recognition and identification in poorer atmospheric conditions.

To reiterate, the base XR algorithm utilizes a single reference image and produces a motion vector for relating the current input video to that reference image. The base XR algorithm then attempts to align the zoomed up input image to a reference image. It determines the best alignment, and then blends the zoomed input image into the reference image, assuming a satisfactory correlation is declared. This provides a disadvantage for all pixels that do not happen to align optimally with the average motion of the region of interest.

The present invention allows one to operate in three unique modes. First, the hardware required to perform this algorithm enhancement is still fully capable of performing the base XR as presently known. This mode still has one motion vector for the whole field of view, which still results in smearing of detail outside of the target region of interest.

The present invention offers two additional modes: reference stabilized and input stabilized. In the reference stabilized mode, one maintains a reference image by lag filtering in shifted input pixels to improve the reference image just as the base XR algorithm does. A difference between the two approaches is that one aligns each reference pixel with the best match in the input image on an individual pixel basis. If the target is rotating or one is rotating about it, the pixels have a better chance of not being smeared because the motion vector for each pixel is allowed to deviate from the average motion vector of the whole target. Additionally, if there were a number of targets all moving within the field of view, those targets would also be enhanced whereas the base XR algorithm would totally distort any target that was not moving in unison with the target of interest In the third mode, one attempts to enhance the input image at all times via a "transparent" XR algorithm. This tries to align the best match within the reference image to the current input image. This avoids the stabilization effect that one currently gets from the prior art XR algorithm, which can mislead the observer into thinking that the object of interest is stationary. In this mode, the sensor image looks just like it does without XR, only the resolution and image fidelity is much higher. This is ideal for surveillance operations where the operator just wants to look out at the scene and does not want to track any objects. Multiple targets all moving in different directions can be enhanced without the operator worrying about whether he/she was being fooled into thinking that a moving object was not really moving. In this mode, the user would not even realize that any form of image enhancement was running. Instead, he/she would simply think the picture was much clearer than is usual.

The present invention is useful in numerous commercial applications such as:

(1) Security/surveillance systems—improve video resolution of live or previously recorded video.

(2) Police, Fire/Rescue—can provide much sharper picture for helicopter based search and/or tracking applications.

(3) Motion Picture Restoration—can be used to extract lost detail while averaging out Gaussian noise.

(4) Television Broadcast—can provide improved image detail to most any video signal that has consistent distinguishable detail.

(5) Television Receivers—can be used to provide improved picture sharpness as well as 2×, 4×, and even higher electronic zoom features while bringing out detail (without this algorithm, electronic zoom would either appear blocky or blurry).

(6) Home Video Enthusiasts—can improve the image fidelity for people who wish to transfer their home movies from VHS to DVD.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for processing imagery using an Electro-Optical (EO) system, the method comprising the steps of:
   selecting a first frame of data as a template frame;
   capturing a second frame of data using the EO system;
   for a plurality of pixels of the second frame, correlating the plurality of pixels of the second frame with pixels of the template frame to generate a plurality of shift vectors, one for each pixel of the plurality of pixels of the second frame;
   registering the second frame with the template frame by interpolating the second frame using the plurality of shift vectors and sampling at least a portion of the second frame to produce a registered frame;
   sampling the template frame;
   combining the sampled template frame and the registered frame to generate an averaged frame; and
   permitting a user to switch to an alternate method of image enhancement providing a single shift vector rather than one for each pixel of the second frame.

2. The method of claim 1 wherein sampling comprises electronic zooming.

3. The method of claim 1 additionally comprising the step of digitally enhancing and/or filtering the second frame.

4. The method of claim 1 wherein the registering step motion compensate aligns the second frame to the template frame.

5. The method of claim 1 wherein the registering step motion compensate aligns the template frame to the second frame.

6. The method of claim 1 wherein at least the registering step is executed by a Geometric Arithmetic Parallel Processor (GAPP) processor.

7. The method of claim 6 wherein each pixel of the second frame has a one-to-one correspondence with processing elements of the GAPP processor.

8. The method of claim 1 wherein at least the registering step is executed by a Field Programmable Gate Array (FPGA).

9. The method of claim 1 wherein the registering and resampling steps result in a unique reference image comprising the sampled template frame for each pixel of the second frame.

10. An Electro-Optical (EO) system for processing imagery, said system comprising:
    a sensor for generating input data; and
    a processor module coupled to the sensor, the processor module configured to:
    select a first frame of data as a template frame;
    capture a second frame of data using the EO system;
    for a plurality of pixels of the second frame, correlate the plurality of pixels of the second frame with pixels of the template frame to generate a shift vector a plurality of shift vectors, one for each pixel of the plurality of pixels of the second frame;
    register the second frame with the template frame by interpolating the second frame using the plurality of shift vectors and re-sampling at least a portion of the second frame to produce a registered frame;

sample the template frame;
combine the sampled template frame and the registered frame to generate an averaged frame; and
permit a user to switch to an alternate type of image enhancement providing a single shift vector rather than one for each pixel of the second frame.

11. The system of claim 10 wherein said processor module samples via electronic zooming.

12. The system of claim 10 wherein said processor module is additionally configured to digitally enhance and/or filter the second frame.

13. The system of claim 10 wherein said processor module registers by motion compensate aligning the second frame to the template frame.

14. The system of claim 10 wherein said processor module registers by motion compensate aligning the template frame to the second frame.

15. The system of claim 10 wherein said processor module comprises a Geometric Arithmetic Parallel Processor (GAPP) processor.

16. The system of claim 15 wherein each pixel of the second frame has a one-to-one correspondence with processing elements of said GAPP processor.

17. The system of claim 10 wherein said processor module comprises a Field Programmable Gate Array (FPGA).

18. The system of claim 10 wherein said processor module by registering and sampling creates a unique reference image comprising the sampled template frame for each pixel of the second frame.

* * * * *